April 18, 1961
G. M. WIDELL
2,979,891
THRUST CONTROL APPARATUS FOR LIQUID
PROPELLANT ROCKET ENGINES
Filed March 31, 1958
3 Sheets-Sheet 3
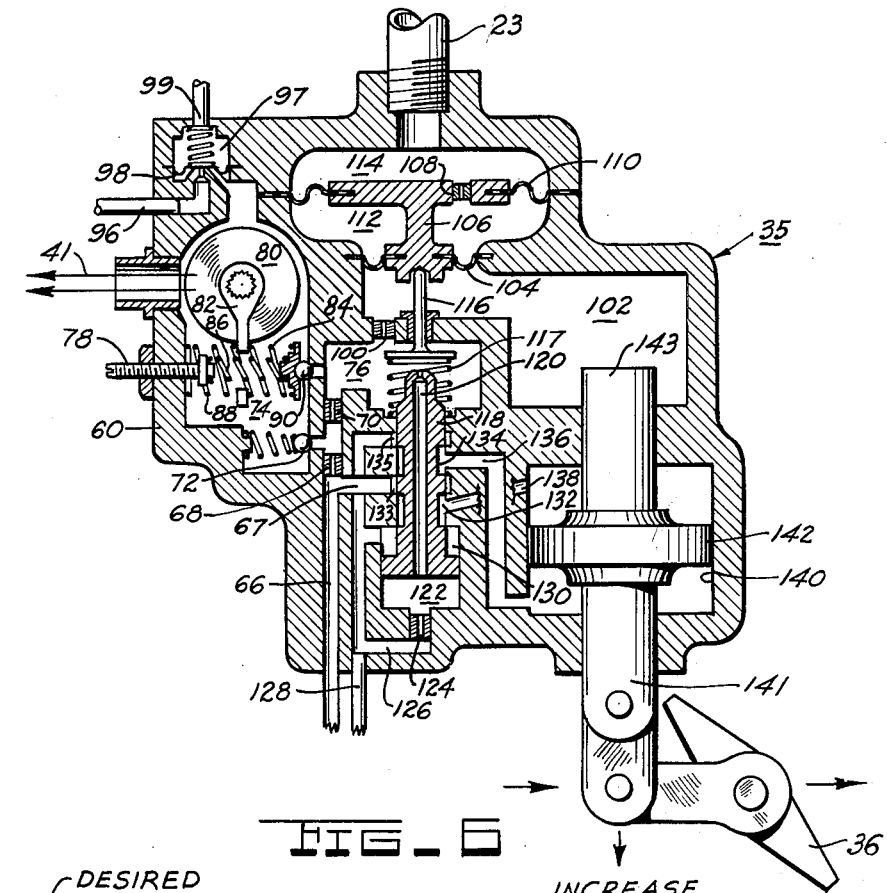
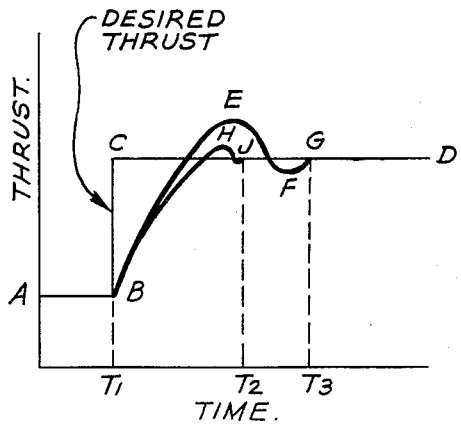
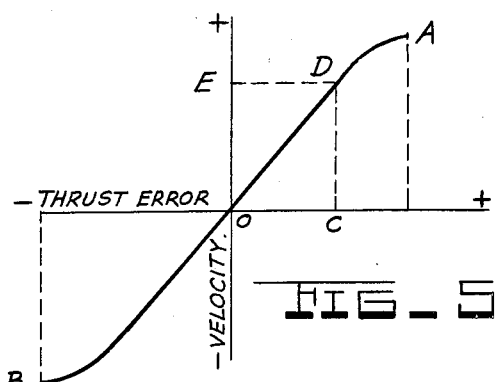
INVENTOR.
GEORGE M. WIDELL
BY
ATTORNEY.

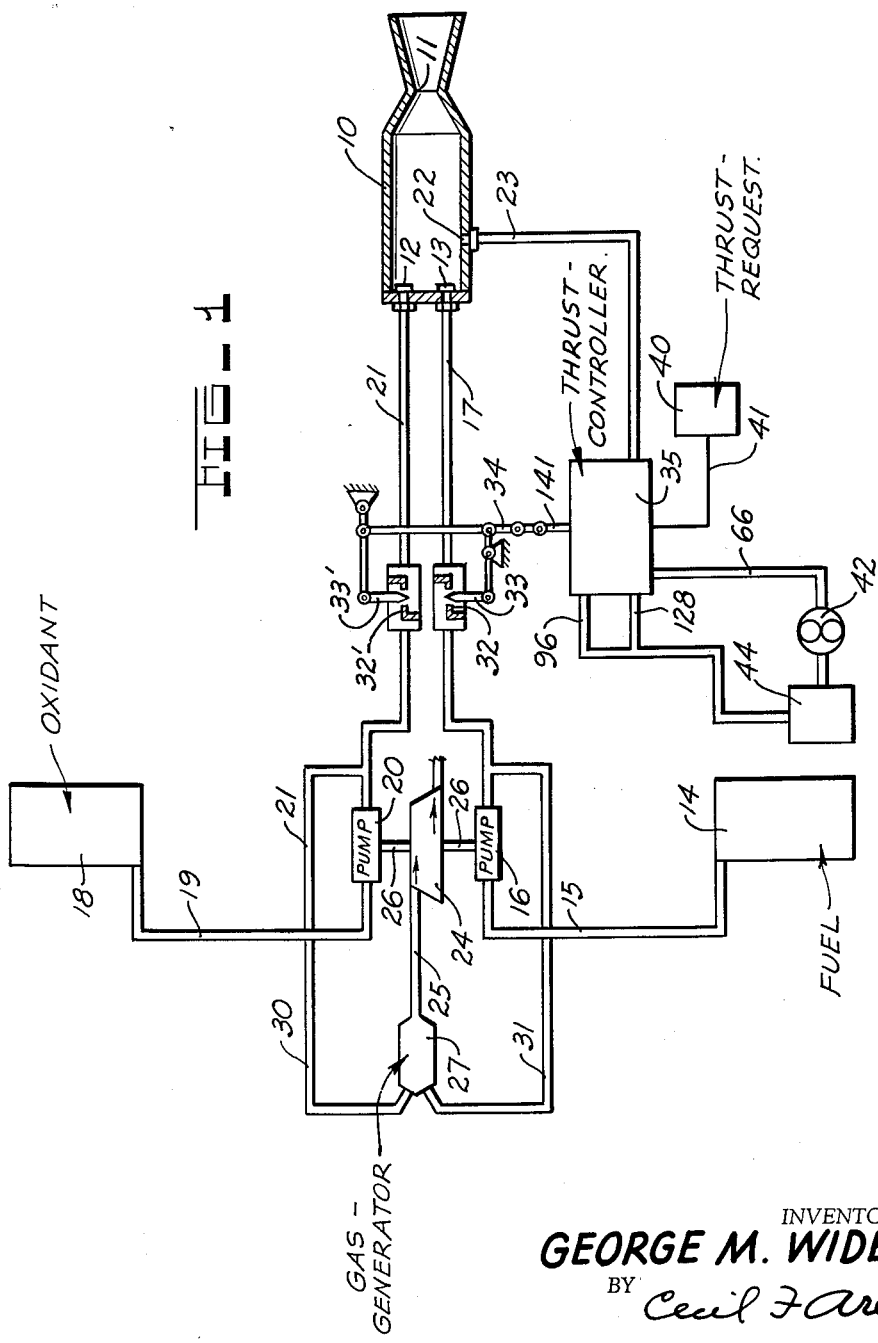

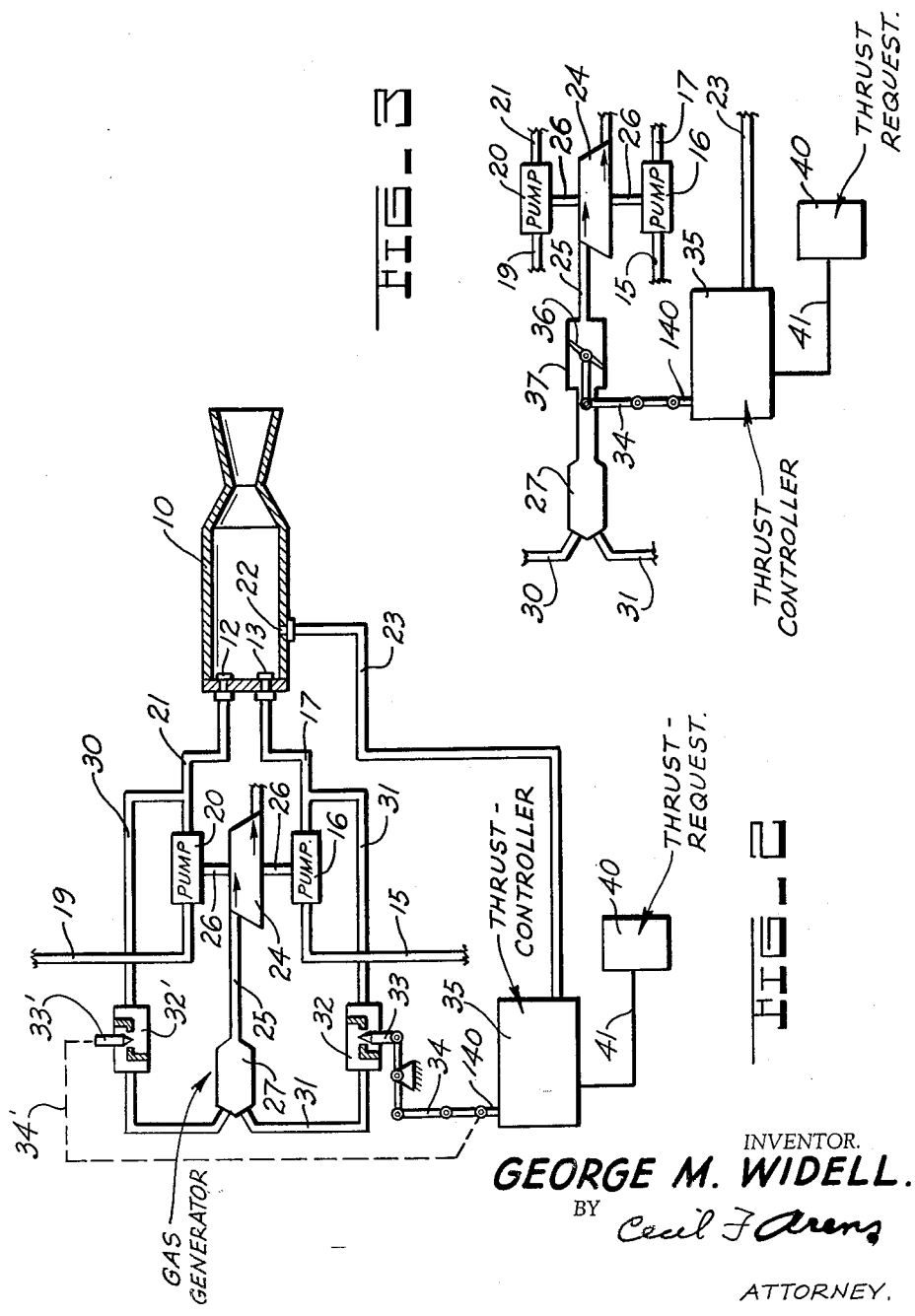

United States Patent Office 2,979,891
Patented Apr. 18, 1961

2,979,891

THRUST CONTROL APPARATUS FOR LIQUID PROPELLANT ROCKET ENGINES

George M. Widell, South Bend, Ind., assignor to The Bendix Corporation, a corporation of Delaware Filed Mar. 31, 1958, Ser. No. 725,394

10 Claims. (Cl. 60—35.6)

The present invention relates to controls for liquid propellant rocket engines and more particularly to a system for controlling the flow of liquid propellant to the main thrust or combustion chamber of a rocket engine.

In a liquid propellant rocket engine, it is frequently desirable to control thrust or thrust chamber pressure by modulating propellant flow to the combustion chamber in accordance with a request or control signal. In the case of a bi-propellant engine, wherein the propellant pumps are driven by a turbine which derives its energy from the products of combustion in a smaller secondary chamber, or gas generator, propellant flow to the thrust chamber may be modulated by throttling or by-passing the pump discharge, by throttling the hot gases flowing to the turbine, or by throttling the propellant flow to the gas generator. It may be further desirable to control the engine thrust output as a function of various variables such as time, acceleration, velocity, or a manual control throttle member when the rocket engine is utilized to propel aircraft or guided missiles.

It is, therefore, an object of the present invention to provide a control system for a liquid propellant rocket engine which is adapted to control rocket engine thrust in response to a thrust request signal by modulating propellant flow.

It is another object of this invention to provide a control system to control rocket thrust that is insensitive to load changes in the system occasioned by wear or dirt or other external causes.

It is another object to provide an integrating control system wherein the rate of control response is a function of thrust error or error between actual and requested engine thrust.

It is another object of this invention to provide a control system to control engine thrust that is responsive to the rate of change of engine thrust to minimize a thrust overshooting or undershooting condition.

Various other objects, advantages and features of this invention will become apparent from the following detailed description taken in conjunction with the accompanying drawings, in which:

Figure 1 is a schematic view illustrating an application of the present invention to control the flow of liquid propellant to a rocket engine;

Figure 2 is a schematic view illustrating a second embodiment of an application of this invention;

Figure 3 is a partial schematic view of a third embodiment of this invention;

Figure 4 is a graph showing the operating characteristics of my thrust control system;

Figure 5 is a graph showing additional operating characteristics of my thrust control system; and Figure 6 illustrates a sectional view of the control system in accordance with the present invention.

Referring now to the drawings in detail and to Figure 1 in particular, the numeral 10 indicates a main thrust chamber of one form of rocket engine to which the control system of this invention is particularly applicable.

Thrust chamber 10 communicates with nozzle 11 through which the burning gases are expelled, thereby producing the propulsive thrust. Thrust chamber 10 is supplied with a liquid fuel from a tank 14 by a conduit 15, a fuel pump 16, and a conduit 17. Chamber 10 is further supplied with an oxidant such as liquid oxygen from a tank 18 through conduit 19, oxidant pump 20, and conduit 21. Fuel pump 16 and oxidant pump 20 are connected to turbine 24 through shaft 26. Gas generator 27 receives small quantities of the propellants through conduits 30 and 31 and combustion occurs therein forming a gaseous motive fluid which is then conveyed to turbine 24 through conduit 25 driving the turbine and pumps connected thereto. Conduit 17 contains an orifice 32 and valve member 33 operable to vary the effective restriction to fuel flow. Conduit 21 also contains an orifice 32' and a valve member 33' operable to control the supply of oxygen to thrust chamber 10. The valve members 33 and 33' may be contoured to obtain the desired fuel to oxidant ratio for the various valve positions. Thrust controller 35 is connected to valves 33 and 33' through linkage 34 and controls the valve position in response to the position of shaft member 141 which forms part of the mechanism of controller 35 shown in Figure 6 and described in detail hereinafter.

Thrust controller 35 receives an input thrust request signal through electrical connection 41 and from thrust request device 40, which may be a manually controlled throttle member acting on a potentiometer or some known type of guidance system with an output signal electrical in form. In addition, combustion gases at thrust chamber pressure are transmitted to thrust controller 35 through conduit 23 to provide a signal responsive to actual engine thrust. Control fluid is supplied from tank 44 to thrust controller 35 by pump 42 and conduit 66. Pump 42 may be driven by any suitable means such as a connection, not shown, to turbine 24. Low pressure fluid returns from controller 35 to tank 44 through conduits 128 and 96. Controller 35 positions linkage 34 in response to the input thrust request signal and also the pressure signal which is indicative of actual engine thrust. If conservation of either fuel or oxidant is not a significant consideration, either valve 33 or 33' may be utilized separately by disconnecting one or the other and controlling the combustion in chamber 10 by regulating one propellant.

In Figure 2 there is illustrated a second embodiment incorporating a thrust controller 35 wherein valve 33 and orifice 32 are relocated in fuel conduit 31, and valve 33' and orifice 32' are relocated in oxidant conduit 30. In this configuration, thrust controller 35, through linkage 34 and 34', controls the amount of propellants to generator 27. Thus the speed of pumps 20 and 16 are controlled by increasing or decreasing the amount of motive gaseous fluid generated in generator 27 and transferred to turbine 24. Inasmuch as pump speed controls the amount of propellants delivered to thrust chamber 10, the thrust output of chamber 10 varies as a function of the quantity of propellants supplied to generator 27. In this embodiment, as in the embodiment illustrated in Figure 1, valves 33 and 33' may be utilized either separately or in combination depending on whether or not a predetermined fuel to oxidant ratio is desired.

Figure 3 illustrates a partial view of a third embodiment of my invention wherein valve 36 replaces valves 33 and 33' and is located in conduit 25 between gas generator 27 and turbine 24. In this embodiment an unregulated amount of propellants are supplied to generator 27 to form a motive fluid supply. The amount of motive fluid supplied to drive turbine 24 is, however, controlled by the relative opening of valve 36 which in turn controls the turbine pump speed and the amount of propellants supplied to thrust chamber 10.

It is the function of my invention described herein to cause engine thrust to be controlled in accordance with the operating characteristic shown graphically in Figure 4. This figure shows a graph in which thrust is plotted on the vertical axis and time on the horizontal axis. Under steady state operating conditions and less than maximum thrust output, line AB represents both desired and actual engine thrust. On an increase in thrust request from point B to point C, actual engine thrust would follow a pattern shown by curve BEFG. At point G and at an elapsed time of T1 minus T3, the actual thrust again equals desired thrust as represented by line GD and the engine is again operating under steady state operating conditions. In order to reduce undesirable overshooting and undershooting represented by departure of points E and F from line CD the thrust control system incorporates a phase lead mechanism hereafter described in detail to dampen out the overshooting condition and cause actual thrust to follow the curve BHJ. In addition the elapsed time T1—T2 required to assume steady state operation is considerably reduced from the time T1—T3 required without the phase lead mechanism.

Figure 5 is a second graph illustrating additional operating characteristics of my thrust control system. In general it is a function of this control system to position a propellant control valve in response to a thrust error signal which represents the difference between actual and desired engine tthrust. It is a further function of my thrust control device to position the propellant control valve at a rate which is functionally related to the degree of thrust error, such that the greater the thrust error the faster the propellant control valve will move to correct this error. In the graph of Figure 5, the rate or velocity at which the propellant control valve is moved is plotted on the vertical axis, with plus values indicating the valve moving in a direction to increase actual thrust and minus values to indicate the valve is decreasing actual thrust. Thrust error is plotted on the horizontal axis. The plus values indicate desired thrust exceeds actual thrust and the minus values indicate that the actual thrust exceeds desired thrust. The curve OA therefore indicates the thrust error vs. velocity relationship during acceleration of the engine while curve OB represents the relationship during deceleration. If at a given instant my thrust control mechanism senses a thrust error indicated by point C, then the propellant control valve will move at a velocity E in a direction to increase actual engine thrust. If the thrust error is greater or less than that of point C it can be seen from Figure 5 that the velocity at which the valve corrects the thrust error will be correspondingly greater or smaller.

Referring now to Figure 6, my thrust control system is shown generally in a houing designated by numeral 60. It is the function of the mechanism shown therein to control the position of a propellant control valve in response to a thrust request signal. Hydraulic fluid at a relatively high supply pressure enters thrust controller 35 through conduit 66 formed in housing 60. Part of the supply fluid flows through restrictive orifice 68 and into a section of conduit 66 stabilized at slightly lower pressure by spring loaded check valve 72 which is interposed between conduit 66 and low pressure chamber 74. Fluid flow in conduit 66 and downstream of orifice 68 is divided with part of it going past relief valve 72 into chamber 74 and the rest going through restrictive orifice 70 in conduit 66 and into chamber 76. Fluid in chamber 74 is maintained at a relatively constant pressure by spring loaded diaphragm 98 which controls the flow of fluid out of chamber 74 and into drain line 96. Chamber 97 formed by diaphragm 98 and housing 60 is vented through orifice 99 to atmospheric pressure to provide a reference pressure for the control fluid. For certain operations it may be desirable to use absolute pressure as a reference and accordingly chamber 97 may be evacuated and orifice 99 sealed. Chamber 76 which receives the regulated fluid from conduit 66 is maintained at essentially the desired thrust chamber pressure by a second relief valve 90 positioned between chambers 74 and 76. The torque motor 80 in chamber 74 receives a thrust request signal through electrical connection 41 and varies the pressure of fluid in chamber 76 in response thereto by varying the valve closing force applied to valve 90 through torque arm 82 and springs 84 and 88. Fluid pressure in chamber 76 is further adjustable externally by spring retainer 78 which is threadedly engaged with housing 60 and applies a closing force to valve 90 through spring 86. Thus any departure of pressure in chamber 76 from desired thrust chamber pressure can be corrected by an external adjustment to retainer 78. Desired thrust chamber pressure in chamber 76 communicates with chamber 102 through restrictive orifice 100 wherein the fluid pressure exerts a force on the lower face of diaphragm 104 which is fixedly secured at its outer edge by housing 60 and at its inner edge by movable piston member 106.

Combustion gases at thrust chamber pressure enter the thrust controller 35 through conduit 23 and into chamber 114 formed in housing 60. Diaphragm 110 is fixedly secured to housing 60 on its outer edge and by member 106 on its inner edge and with member 106 it forms one side of chamber 114 and is thereby exposed to thrust chamber pressure. Chamber 112 is formed between diaphragms 104 and 110 and communicates with thrust chamber pressure through phase lead orifice 108 in member 106. Orifice 108 restricts the flow of combustion gases therethrough, such that a pressure differential is established across diaphragm 110 which is proportional to the rate of change of thrust chamber pressure. When thrust chamber pressure is constant, orifice 108 permits the pressure in chambers 112 and 114 to equalize. In addition the pressure of combustion gases in chamber 112 is applied to diaphragm 104 in opposition to the force applied by thrust request responsive fluid in chamber 102. Thus the pressure differential across diaphragm 104 represents the error between desired and actual thrust chamber pressure. Inasmuch as member 106 is movable, it will be positioned in response to a thrust error pressure difference across diaphragm 104 and phase lead pressure difference across diaphragm 110.

Valve stem 116 contacts and follows member 106 due to a small upward force applied by spring 117. Fluid pressure in chamber 76 acts on the upper end of valve 118 and in addition flows through passage 120 and into chamber 122 where it exerts a force on the lower end of valve 118. Restrictive orifice 124 is contained in passage 126 which communicates chamber 122 with drain conduit 128 and permits the pressure of fluid in chamber 122 to be controlled by the relative position of valve stem 116 with respect to spool valve 118. It should be noted that the effective area of valve 118 acted on by fluid pressure in chamber 122 is greater than that acted on by fluid in chamber 76, thus permitting upward movement of valve 118 when clearance between valve stem 116 and valve 118 is great. Under steady state conditions valve stem 116 remains stationary and the forces due to pressure application on valve 118 are balanced out. Assume now, however, the valve stem 116 is repositioned downward toward valve 118 as during engine deceleration when thrust request pressure is less than actual thrust pressure. Fluid flow into passage 120 would be restricted causing the pressure of fluid in chamber 122 to decrease and upset the force balance causing valve 118 to move downward. As valve 118 moves downward the clearance between valve stem 116 and valve 118 increases causing fluid pressure in chamber 122 to increase until the forces acting on valve 118 are again balanced out. If valve stem 116 were repositioned upward as during engine acceleration, substantially the reverse operation would occur, such that any motion imparted to valve stem 116 by member 106 will be transferred to spool valve 118.

Spool valve 118 has a first annular recess 134 and a second annular recess 132 which are in communication with conduits 136 and 138, respectively. Conduits 136 and 138 terminate at opposite ends of a piston chamber 140 and transmit fluid to piston 142 contained therein. Fluid at supply pressure is supplied to valve 118 from conduit 66 through branch conduit 67 and annular chamber 133 formed in housing 60 and adjacent to valve 118. Fluid at low or drain pressure is supplied through conduit 128 to valve 118 at two annular chambers 130 and 135 also formed in housing 60 and adjacent to spool valve 118.

Figure 6 illustrates valve 118 in a null position wherein the annular chambers 130, 133, and 135 are covered by valve 118 and only fluid leakage of substantially identical amounts are allowed to enter conduits 136 and 138. In this position fluid pressure forces tending to move piston 142 are in balance and no movement results. When valve 118 moves downward annular recess 134 communicates high pressure chamber 133 with conduit 136. At the same time annular recess 132 communicates low pressure chamber 133 with conduit 138. This causes a pressure differential across piston 142 moving it upward. Upward movement of valve 118 from its null position diverts high pressure fluid from chamber 133 through annular recess 132 to conduit 138 and to the upper surface of piston 142 and the resultant pressure differential causes piston 142 to move downward.

Piston 142 is connected to propellant control valve 36 through linkage 34 and a first piston shaft 141, such that propellant supplied to thrust chamber 10 is controlled in response to movement of piston 142.

Piston ram member 143 is integrally connected to piston 142 and extends through an inner wall of housing 60 and into chamber 102. Fluid is displaced in chamber 102 by movement of ram 143 and at a rate proportional to the velocity of ram 143 and piston 142. Restrictive orifice 100 limits the flow from or into chamber 102, thus causing a pressure increase or decrease in chamber 102 corresponding to the rate of fluid displacement and acting on diaphragm 104.

Member 106 is therefore biased in a direction opposing the thrust error force and by an amount proportional to the velocity of ram 143.

*Operation*

Operation of the present control may be best understood from consideration of a typical acceleration. A thrust increase signal originates in thrust request device 40 and causes the pressure in chamber 102 to increase in response thereto through the operation of torque motor 80 and check valve 90. The increased thrust request signal causes member 106 to move upward. Through the action of spool valve 118 which follows member 106, piston 142 moves in a downward direction opening propellant control valve 36, increasing the amount of propellant supplied to thrust chamber 10. Increased combustion occurs raising the pressure of combustion gases and also increasing the thrust output of the rocket engine. Combustion gases at an increased pressure are conveyed to member 106 at chamber 112 tending to reposition it back to a neutral or no-error position. This above operation comprises essentially a closed loop system wherein an input signal (thrust request) controls engine thrust, and engine thrust in turn stabilizes or balances out the input signal. Superimposed on this basic closed loop system are two improvements to make my thrust control system more adaptable to control rocket engines.

First, the rate of change of pressure of the combustion gases is sensed by a large phase lead diaphragm 110 in combination with a restrictive orifice 108 and applies a force to member 106 in a manner to limit the overshoot which would otherwise occur as a result of severe starting transients. During the thrust acceleration of the closed loop system referred to above, as engine thrust began to increase in response to the increased thrust request, the pressure in chamber 114 would exceed that in chamber 112 because of orifice 108, and a resultant force would be applied to member 106. This force would be in opposition to the thrust error force, thus tending to re-null piston 106 more rapidly and prevent overshoot.

A second improvement over the basic closed loop system is a second biasing of member 106 by an actuator rate signal derived from the rate feedback ram 143 and feedback orifice 100. As piston 142 moves to correct engine thrust, ram 143 is positioned at the same rate and displaces fluid in chamber 102. During the acceleration operation previously referred to, piston 142 would move downward to increase the propellant flow to the main thrust chamber 10 in response to the increased thrust request signal. Ram 143 would move downward at the same rate, thus providing additional volume in chamber 102. Since fluid flow into chamber 102 is limited by the capacity of orifice 100, the pressure of the fluid in chamber 102 would drop an amount which is functionally related to the velocity of ram 143. The pressure reduction in chamber 102 is felt by diaphragm 104 and would reduce the resultant error signal which, through the servo valve mechanism previously described, would reduce the pressure differential across piston 142 and limit its rate of travel.

Although the present invention has been described with a certain degree of particularity, it should be understood that the present disclosure has been made by way of example and that numerous changes in the details and construction and the combination and arrangement of parts may be resorted to without departing from the scope or spirit of the present invention.

I claim:
1. In a control apparatus for a liquid propellant rocket engine having a thrust chamber, said apparatus including a metering valve for controlling the supply of liquid propellant to said rocket engine, piston means operatively connected to said valve means to control propellant flow as a function of the position of said piston means, servo valve means operatively connected to said piston means to control the movement of said piston means, first diaphragm means operatively connected to said servo valve means to control the position of said servo valve means as a function of the position of said first diaphragm means, thrust chamber pressure request means operatively connected to said first diaphragm means, engine pressure responsive means responsive to actual engine thrust chamber pressure operatively connected to said first diaphragm means, said thrust request and said engine pressure responsive means acting in opposition on said first diaphragm means to position said first diaphragm means as a function of error between actual and desired engine thrust chamber pressure, second diaphragm means operatively connected to said engine pressure responsive means, said second diaphragm means containing a restrictive orifice operable to establish a pressure differential across said second diaphragm that is a function of the rate of change of actual engine thrust chamber pressure, said second diaphragm means being operatively connected to said first diaphragm means to bias said first diaphragm means to tend to prevent thrust chamber pressure overshoot during engine acceleration and deceleration, and rate feedback means operatively connected to said piston means and said first diaphragm means to limit the rate of said piston movement as a function of said thrust chamber pressure error.

2. In a control apparatus for a liquid propellant rocket engine having a thrust chamber, said apparatus including variable flow control means for controlling the supply of liquid propellant to said rocket engine, piston means operatively connected to said variable flow control means to control propellant flow as a function of the position of said piston means, first diaphragm means operatively connected to said piston means to control piston means as a function of the position of said first diaphragm means, thrust chamber pressure request means operatively connected to said first diaphragm means, engine pressure responsive means responsive to actual engine thrust chamber pressure operatively connected to said first diaphragm means, said request means and said engine pressure responsive means acting in opposition on said first diaphragm means to position said first diaphragm means as a function of pressure error between actual and desired engine thrust chamber pressure, second diaphragm means operatively connected to said engine pressure responsive means, said second diaphragm means containing a restrictive orifice operable to establish a pressure differential across said second diaphragm that is a function of the rate of change of actual engine thrust chamber pressure, said second diaphragm means being operatively connected to said first diaphragm means to bias said first diaphragm to prevent overshoot during engine acceleration and deceleration, and rate feedback means operatively connected to said piston means and said first diaphragm means to limit the rate of said piston movement as a function of said thrust chamber pressure error.

3. In a control apparatus for a liquid propellant rocket engine having a thrust chamber, said apparatus including a metering valve for controlling the supply of liquid propellant to said rocket engine, piston means operatively connected to said valve means to control propellant flow as a function of the position of said piston means, servo valve means operatively connected to said piston means to control the movement of said piston means, first diaphragm means operatively connected to said servo valve means to control the position of said servo valve means as a function of the position of said first diaphragm means, thrust chamber pressure request means operatively connected to said first diaphragm means, engine pressure responsive means responsive to actual engine thrust chamber pressure operatively connected to said first diaphragm means, said request means and said engine pressure responsive means acting in opposition on said first diaphragm means to position said first diaphragm means as a function of error between actual and desired engine thrust chamber pressure, and second diaphragm means operatively connected to said engine pressure responsive means, said second diaphragm means containing a restrictive orifice operable to establish a pressure differential across said second diaphragm that is a function of the rate of change of actual engine thrust chamber pressure, said second diaphragm means further operatively connected to said first diaphragm means to bias said first diaphragm to prevent overshoot during engine acceleration and deceleration.

4. In a control apparatus for a liquid propellant rocket engine having a thrust chamber, said apparatus including a metering valve for controlling the supply of liquid propellant to said rocket engine, first diaphragm means operatively connected to said metering valve to control the position of said metering valve as a function of the position of said first diaphragm means, thrust chamber pressure request means operatively connected to said first diaphragm means, engine pressure responsive means responsive to actual engine thrust chamber pressure operatively connected to said first diaphragm means, said request means and said engine pressure responsive means acting in opposition on said first diaphragm means to position said first diaphragm means as a function of the pressure error between actual and desired engine thrust chamber pressure, and second diaphragm means operatively connected to said engine pressure responsive means, said second diaphragm means containing a restrictive orifice operable to establish a pressure differential across said second diaphragm that is a function of the rate of change of actual engine thrust chamber pressure, said second diaphragm means being operatively connected to said first diaphragm means to bias said first diaphragm to prevent overshoot during acceleration and deceleration of the engine.

5. Control apparatus for controlling the supply of liquid propellant to a thrust chamber comprising: a housing forming a first and second chamber and having an opening therebetween; a diaphragm peripherally secured to said housing at said opening to provide a movable wall between said first and second chambers; means for supplying fluid to said first chamber at a desired pressure level to provide a first pressure force acting on said diaphragm; means for transmitting actual thrust chamber pressure to said second chamber to provide a second pressure force acting on said diaphragm; a servo piston located external to said first and second chambers and operative to control the supply of liquid propellant to said thrust chamber; said diaphragm connected to said piston to control the movement thereof as a function of the difference between said first and second pressure forces; and a ram member connected to said servo piston and movable therewith; said ram member extending into said first chamber to vary said pressure level and said first pressure force as a function of the movement of said servo motor.

6. Control apparatus as claimed in claim 5 wherein the connection between said diaphragm and said servo piston is a two stage servo control valve.

7. Control apparatus as claimed in claim 5 wherein said means for supplying fluid to said first chamber at a desired pressure level is a fluid pressure regulator operative to regulate said pressure level in response to a variable input signal.

8. Control apparatus for controlling the supply of liquid propellant to a thrust chamber comprising: movable means positionable to regulate the rate at which liquid propellant is supplied to said thrust chamber; a first diaphragm connected to said movable means to control the position thereof as a function of the difference in pressures acting on opposite sides of said first diaphragm; a second diaphragm connected to said movable means to further control the position thereof as a function of the difference in pressures acting on opposite sides of said second diaphragm; means for supplying fluid to one side of said first diaphragm at a desired pressure level; conduit means for transmitting actual thrust chamber pressure to another side of said first diaphragm and to opposite sides of said second diaphragm; and a restrictive orifice for retarding the change of actual thrust chamber pressure on one side of said second diaphragm.

9. Control apparatus as claimed in claim 8 wherein said restrictive orifice is contained in said second diaphragm.

10. Control apparatus as claimed in claim 8 wherein said first and second diaphragms are first and second pressure responsive members respectively.

References Cited in the file of this patent
UNITED STATES PATENTS

| | | |
|---|---|---|
| 2,466,438 | Kalin | Apr. 5, 1949 |
| 2,681,044 | Eggenberger | June 15, 1954 |
| 2,697,327 | Hazen et al. | Dec. 21, 1954 |
| 2,771,062 | Hayner | Nov. 20, 1956 |
| 2,824,548 | Roche et al. | Feb. 25, 1958 |

FOREIGN PATENTS

| | | |
|---|---|---|
| 578,311 | Great Britain | June 24, 1946 |

OTHER REFERENCES

Publication: "Rocket Propulsion Elements" (Sutton), published by Wiley & Sons, Inc., 1956, pages 297–299.